(12) United States Patent
Atsuta et al.

(10) Patent No.: US 7,391,011 B2
(45) Date of Patent: Jun. 24, 2008

(54) OPTICAL ENCODER CAPABLE OF DETECTING ABSOLUTE POSITION

(75) Inventors: Akio Atsuta, Kanagawa-ken (JP); Masahiko Igaki, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 423 days.

(21) Appl. No.: 11/137,989

(22) Filed: May 25, 2005

(65) Prior Publication Data
US 2005/0263689 A1  Dec. 1, 2005

(30) Foreign Application Priority Data
May 26, 2004  (JP)  .............................. 2004-155772

(51) Int. Cl.
*G01D 5/34* (2006.01)

(52) U.S. Cl. .............................. 250/231.18; 250/237 G; 250/231.14; 250/231.16; 356/617; 33/1 N

(58) Field of Classification Search ..................
250/231.13–231.18, 237 R, 237 G; 356/616–619; 341/11, 13, 31; 359/436–442; 33/1 PT, 33/1 N
See application file for complete search history.

(56) References Cited

U.S. PATENT DOCUMENTS

| | | | | |
|---|---|---|---|---|
| 4,360,730 A | * | 11/1982 | Breslow | ................. 250/231.13 |
| 4,445,110 A | * | 4/1984 | Breslow | ....................... 341/10 |
| 5,929,789 A | | 7/1999 | Barbehenn | |
| 6,630,659 B1 | | 10/2003 | Stridsberg | |
| 6,822,220 B2 | * | 11/2004 | Lesniak | .................. 250/231.13 |

FOREIGN PATENT DOCUMENTS

| | | | |
|---|---|---|---|
| JP | 60-113107 A | | 6/1985 |
| JP | 6-56304 A | | 3/1994 |
| JP | 10-318790 A | | 12/1998 |
| JP | 2003-161645 A | | 6/2003 |

OTHER PUBLICATIONS

Korean Office Action dated Jan. 29, 2007.
Chinese Office Action dated Dec. 15, 2006.

* cited by examiner

*Primary Examiner*—Georgia Y. Epps
*Assistant Examiner*—Francis M Legasse, Jr.
(74) *Attorney, Agent, or Firm*—Morgan & Finnegan LLP

(57) ABSTRACT

In two phases signals (A, B) outputted from a scale or a scale having a discontinuous portion provided in its incidental member to a light receiving portion, a region in which amplitudes of the two phases signals (A, B) are small corresponds to outputs when a reflecting portion lies in the scale in terms of rotation position, and a region in which amplitudes of the two phases signals (A, B) are large corresponds to outputs when a nonreflecting portion lies in the scale in terms of rotation position. An optical encoder for discriminating positions of a reflecting portion and a nonreflecting portion of a scale using a threshold value (L) to detect an absolute position based on a reason that when the signals (A, B) are arithmetically operated by an arithmetic operation processing circuit to obtain a sum of squares of the signals (A, B), change points in the amplitudes of the signals (A, B) are steeply obtained.

3 Claims, 3 Drawing Sheets

OPTICAL ENCODER CAPABLE OF DETECTING ABSOLUTE POSITION

BACKGROUND OF THE INVENTION

1. Field of the Invention

The present invention relates to an optical encoder which is used for displacement measurement or angle measurement and which is capable of detecting an absolute position.

2. Related Background Art

An optical encoder basically includes a main scale in which a first optical grating is formed, an index scale which is disposed so as to face the main scale and in which a second optical grating is formed, a light source for radiating light to the main scale, and a light receiving element which serves to receive light transmitted through or reflected by the first optical grating of the main scale to return from the second optical grating of the index scale.

A system using a light receiving element array serving as an index scale as well in an optical encoder of this sort has been already proposed in Japanese Patent Application Laid-Open No. H06-56304 for example. In addition, there is also filed Patent Application entitled "Optical Encoder" having the similar construction and laid open as Japanese Patent Application Laid-Open No. 2003-161645.

An encoder having this construction is called an encoder of an incremental type and can detect an amount of movement based on an increase or a decrease in pulses for the movement of a scale. The encoder of an incremental type involves a problem in that since an absolute position of a rotation angle is obscure, so a sensor for detecting the absolute position is specially required.

In Japanese Patent Application Laid-Open No. H10-318790, in order to avoid the above problem to detect the absolute position in a transmission type encoder utilizing an incremental system, as shown in FIG. 7, transmittances of slits 2 disposed in a scale 1 are changed. For example, the transmittance of the slit 2a is set to 1, and the transmittances of the slits 2b, 2c, and 2d arranged in a row and in order are gradually reduced.

FIG. 8 shows a change in signal obtained when portions in which the transmittances of the slits 2 are changed pass through a sensor in a case where the scale 1 is used. Thus, analog two phases signals Oa and Ob are obtained from the sensor. Amplitudes of the analog two phases signals Oa and Ob are reduced due to the gradual reduction of the transmittances of the slits 2. Thus, this change is detected, thereby detecting the absolute position.

However, in case of the absolute position detecting means of the encoder as described above, for a method of detecting the signal amplitude, it is required to carry out the sampling at a timing much shorter than one period of the resultant encoder signal and to obtain the voltages of a peak and a valley of the signal obtained therefrom.

Consequently, in a state in which the scale is stopped, it is impossible to know a position where a predetermined portion is located.

In addition, in order to know the amplitude of the signal, there is required a circuit, having a large circuit scale, such as a high-speed A/D converter for carrying out sampling at a short timing. Moreover, it is necessary to precisely form the portions, having different transmittances, such as the slits 2 of the scale 1 shown in FIG. 7. Thus, there is a possibility that the actual amplitude change disperses.

SUMMARY OF THE INVENTION

The present invention has been made in order to alleviate the above disadvantageous points, and it is, therefore, an object of the present invention to provide an optical encoder which is capable of detecting an absolute position through provision of a discontinuous portion in a scale or an incidental member of the scale.

In order to attain the above object, according to the present invention, there is provided an optical encoder for detecting relative movement of a scale to output two phases signals related to the detected relative movement, including: the scale having an optical grating formed therein; a light receiving portion having a plurality of photodiodes adapted to relatively move with respect to the scale and disposed so as to be associated with a pitch of the optical grating; and a light emitting portion for radiating light to the light receiving portion through the scale, in which an optically discontinuous portion is provided in the scale or an incidental member of the scale, and a state in which the discontinuous portion passes through the light receiving portion and a state in which the discontinuous portion does not pass through the light receiving portion are detected using a sum of squares obtained by summing up squares of the two phases signals obtained from the light receiving portion.

According to the optical encoder of the present invention, when an absolute position is detected, a sum of squares is arithmetically operated based on amplitudes of the two phases signals, whereby it becomes possible to clearly detect where the scale is located, and hence it is possible to realize a high-speed positioning sequence.

In addition, with respect to a circuit configuration, there is required only a circuit for detecting and arithmetically operating signal levels of the encoder. Hence, the absolute position can be detected with a simple configuration without especially increasing the number of circuits.

DETAILED DESCRIPTION OF THE PREFERRED EMBODIMENTS

The present invention will hereinafter be described in detail based on Embodiments shown in FIGS. 1 to 6.

Embodiment 1

Figure 1:
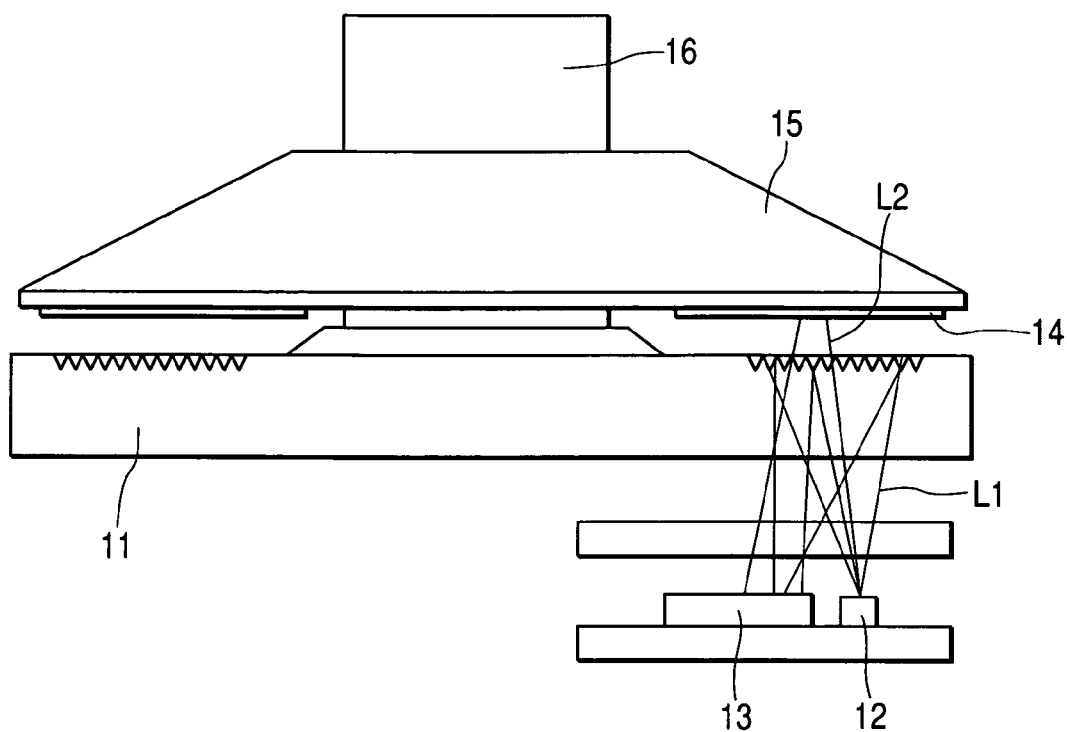
FIG. 1 is a schematic view showing a construction of an optical system according to Embodiment 1 of the present invention.

FIG. 1 is a schematic view showing a construction of an optical system according to Embodiment 1 in which a reflection type micro roof mirror array is adopted as a shape of a scale 11 as a moving member. Such a micro roof mirror array is adopted, thereby allowing utilization efficiency of light to be enhanced. A basic construction of an optical system using the micro roof mirror array is disclosed in Japanese Patent Application Laid-Open No. 2002-323347.

Embodiment 1 shows a rotation type encoder having a reflection type scale 11. A light emitting portion 12 and a light receiving portion 13 are disposed on one side with respect to the scale 11. A reflecting plate 14 having an effect of reflecting light transmitted through the scale 11 to return the light to the light receiving portion 13 is provided on a side opposite to that of the light emitting portion 12 and the light receiving portion 13 of the scale 11. The reflecting plate 14 is stuck on a holding element 15 so as to be able to rotate together with the scale 11 around a common rotation shaft 16.

Figure 2:
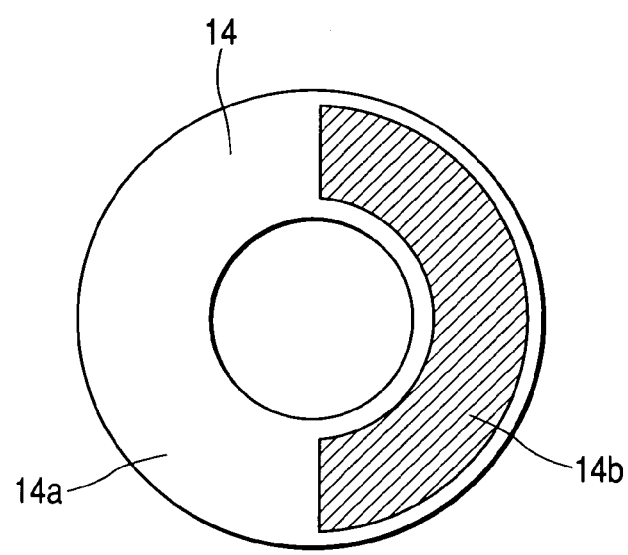
FIG. 2 is a plan view of a reflecting plate.

FIG. 2 shows a pattern of a reflecting portion 14a and a nonreflecting portion 14b of the reflecting plate 14. As shown in FIG. 2, each of the reflecting portion 14a and the nonreflecting portion 14b has just a half-moon shape. Also, the nonreflecting portion 14b becomes a discontinuous portion with respect to a rotation direction.

Light emitted from the light emitting portion 12 reaches the scale 11 through an optical path L1 to be reflected by the scale 11 to return back to the light receiving portion 13, thereby generating two phases encoder signals A and B as position pulses. In addition, a part of the light emitted from the light emitting portion 12 passes through the scale 11 along an optical path L2 and is reflected by the reflecting portion 14a of the reflecting plate 14 to return back to the light receiving portion 13 through the scale 11 again.

The light traveling along the optical path L2 is light used to generate a signal for obtaining an absolute position unlike the two phases encoder signals A and B, i.e., DC light having no relation to the reflection pattern of the scale 11.

Consequently, when the reflecting portion 14a lies in a rear side of the scale 11, the light receiving portion 13 operates as if the DC light is made incident to the light receiving portion 13. Thus, a quantity of light from the light emitting portion 12 is stopped so that levels of the two phases encoder signals A and B obtained in the light receiving portion 13 become small.

Figure 3A:
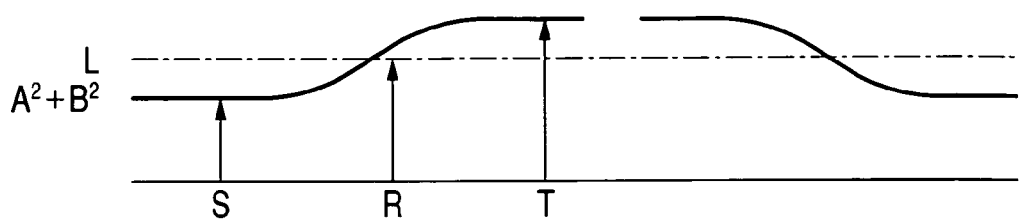
FIG. 3A is a graphical representation showing a rotation position of an encoder and a sum of squares of two phases signals A and B.
Figure 3B:
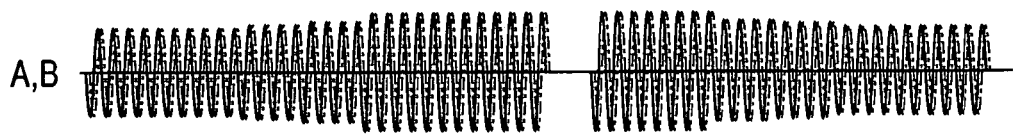
FIG. 3B is a waveform chart of the two phases signals A and B.

In FIG. 3A, an axis of abscissa represents a rotation position of the scale 11, and an axis of ordinate represents a sum, $(A^2+B^2)$, of squares which is obtained by summing up squares of the amplitudes of the two phases encoder signals A and B. FIG. 3B is an output waveform chart of the two phases encoder signals A and B. In FIG. 3B, the signal A is represented by a solid line, and the signal B is represented by a dashed line. Also, in FIG. 3B, a region in which the amplitudes of the two phases encoder signals A and B are small corresponds to the outputs when the reflecting portion 14a lies in the rear side of the scale 11 in terms of the rotation position, while a region in which the amplitudes of the two phases encoder signals A and B are large corresponds to the outputs when the nonreflecting portion 14b lies in the rear side of the scale 11 in terms of the rotation position.

A sum of squares is obtained by arithmetically operating the two phases encoder signals A and B taken in by an A/D converter or the like in an arithmetically operation processing circuit such as a microcomputer. In accordance with the sum of squares, since change points in the amplitudes of the two phases encoder signals A and B are steeply obtained, a boundary line between the reflecting portion 14a and the nonreflecting portion 14b is easy to detect due to a use of a comparison voltage threshold value L. Thus, the boundary line between the reflecting portion 14a and the nonreflecting portion 14b can be much more clearly detected than that in a case where the two phases encoder signals A and B are simply used.

As described above, since the reflecting portion 14a and the nonreflecting portion 14b are detected using the sum of squares, and the counting from the origin is carried out, a zone of the scale 11 can be grasped and moreover the absolute position can be precisely detected based on the two phases encoder signals A and B.

In addition, for stopping the scale 11 in a stop target position, it is understood that when the stop target position of the scale 11 is assigned R determined based on the comparison voltage threshold value L, if for example, the scale 11 is relatively located in a position S in FIG. 3A, a value of the sum of squares obtained from the processing circuit is smaller than the comparison voltage threshold value L which is set in advance. Thus, the scale 11 can be driven to relatively move to a right-hand side in paper by driving means such as an actuator to reach the stop target position R. Conversely, when the scale 11 is located in a position T, a value of the sum of squares is larger than the comparison voltage threshold value L. Thus, the scale 11 has to be driven to relatively move to a left-hand side in the paper to reach the stop target position R.

Since it is understood based on the output of the sum of squares to which of directions the scale 11 should be driven to relatively move from a stop state, the scale can be readily made reach the stop target position through the shortest distance.

Embodiment 1 adopts the construction in which the positions of two regions for allowing the signal levels to change in positions permitting 180° in position shift can be detected using the reflecting portion 14a and the nonreflecting portion 14b. Alternatively, a plurality of portions different in reflectivity from one another may be stepwisely provided to further divide a zone in order to carry out the detection.

In addition, when a construction is adopted in which the light receiving portion 13 is constituted by a photodiode array and thus a plurality of light and darkness of the reflected light are detected, one or more patterns of the scale 11 are lacked, thereby allowing the signal levels to be changed.

Embodiment 2

Figure 4A:
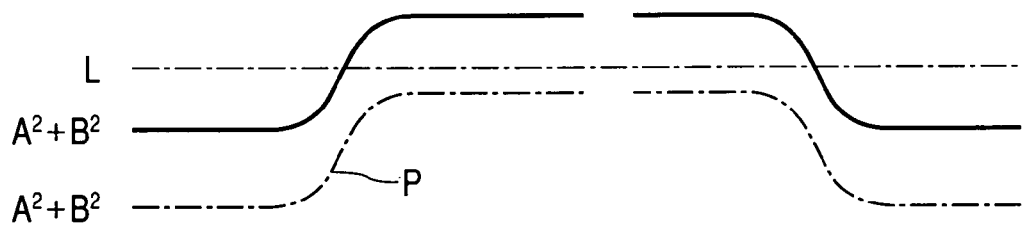
FIG. 4A is a graphical representation showing fluctuation of a sum of squares which becomes unable to be detected due to a temperature change or a long term change.
Figure 4B:
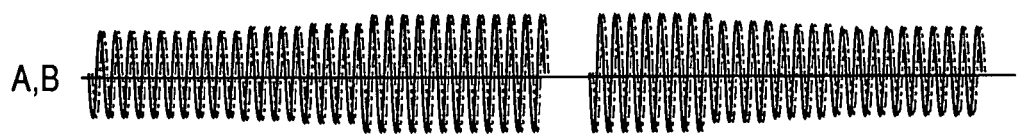
FIG. 4B is a waveform chart of the two phases signals A and B.

FIGS. 4A and 4B show an example in which, in Embodiment 1, the characteristics of circuit components are changed due to a temperature change or a long term change, and thus detection becomes unable to be carried out. As apparent from FIGS. 4A and 4B, when the amplitudes of the two phases encoder signals A and B are reduced due to the temperature change or the like, the amplitude value of the sum, $(A^2+B^2)$, of squares follows a dashed line P. Thus, even when the amplitude value of the sum, $(A^2+B^2)$, of squares is compared with the comparison voltage threshold value L which is set in advance, there is no portion for permitting the sum of squares to have the high level, and hence the zone becomes unable to be detected.

Figure 5:
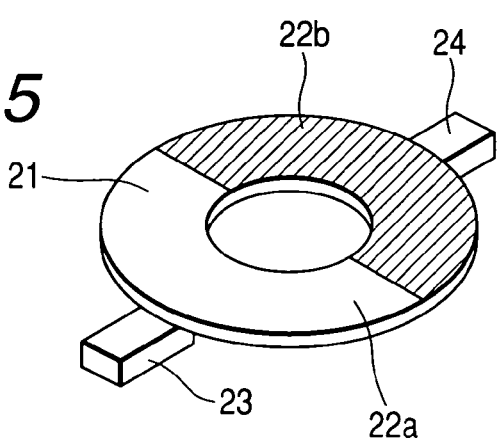
FIG. 5 is a perspective view showing a construction of an encoder according to Embodiment 2 of the present invention.

FIG. 5 is a perspective view showing a construction of an encoder according to Embodiment 2 of the present invention for solving the above problem. A reflecting portion 22a and a nonreflecting portion 22b each having a half-moon shape are provided in a rear surface of a disc-like scale 21. When the reflecting portion 22a lies in the rear surface of the disc-like scale 21, the excessive light returns back to the light receiving portion. Thus, the contrast in the sensor is reduced so that the two phases encoder signals A and B each having a sufficient amplitude cannot be obtained. Then, in Embodiment 2, two sets of sensor heads 23 and 24 each having a light emitting portion and a light receiving portion are disposed in places which are shifted in position by right 180° across the scale 21 from each other.

Figure 6:
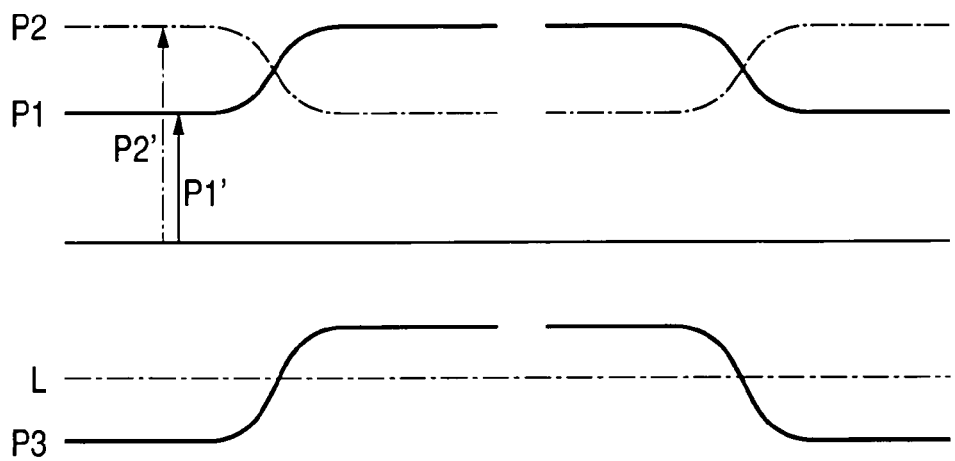
FIG. 6 is a graphical representation of sums of squares obtained from two sensor heads of Embodiment 2, and a difference between the sums of squares.
Figure 7:
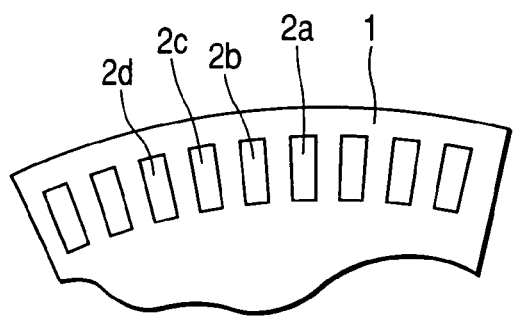
FIG. 7 is a partial plan view showing a construction of a scale of a conventional optical encoder.
Figure 8:
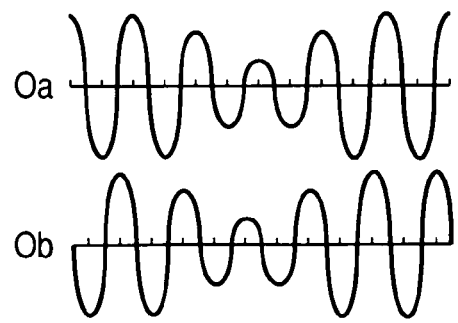
FIG. 8 is a waveform chart of encoder output signals.

In FIG. 6, a solid line P1 represents a level of a sum of squares of the two phases encoder signals A and B from the sensor head 23 shown in FIG. 5, and a dashed line P2 represents a level of a sum of squares of the two phases encoder signals A and B from the sensor head 24 shown in FIG. 5. As apparent from FIG. 6, the signal outputs P1 and P2 show the sums of squares the levels of which are opposite in vertical timing to each other.

When the scale 21, and the sensor heads 23 and 24 show a positional relationship as shown in FIG. 5, the signal amplitude based on the sum of squares of the two phases encoder signals A and B from the sensor head 23 takes a small value P1' since the reflecting portion 22a lies in the rear surface of the scale 21, and conversely, the signal amplitude based on the sum of squares of the two phases encoder signals A and B from the sensor head 24 takes a large value P2' since the nonreflecting portion 22b lies in the rear surface of the scale 21.

A solid line P3 represents an arithmetic operation output corresponding to a difference between the sum, P1, of squares from the sensor head 23 and the sum, P2, of squares from the sensor head 24. The arithmetic operation output P3 becomes plus in sign when the sum, P1, of squares is larger than the sum, P2, of squares, and becomes minus in sign when the sum, P1, of squares is smaller than the sum, P2, of squares. When a difference between the levels of the sums of squares from the two sensor heads 23 and 24 is obtained in such a manner, even if the signal amplitudes are vertically changed due to a temperature change or the like, the levels of the signal outputs P1 and P2 of the sums of squares are vertically changed so as to follow that change, and hence no magnitude relationship changes.

As described above, even if there is a temperature change or the like, the zone information related to where the scale 21 is located can be obtained based on the sum, P1, of squares from the sensor head 23 and the sum, P2, of squares from the sensor head 24 when the encoder is stopped.

In Embodiment 2, in order to detect the absolute position, the two sensor heads 23 and 24 are disposed. With this construction, when an average of the positional information obtained through the arithmetic operation for Arctan or the like is obtained from the values obtained in the sensor heads 23 and 24, respectively, even if the scale 21 is mounted in a state of being biased, this influence can be canceled and hence a precise positional signal is obtained.

This application claims priority from Japanese Patent Application No. 2004-155772 filed May 26, 2004, which is hereby incorporated by reference herein.

What is claimed is:

1. An optical encoder for detecting relative movement of a scale to output two phase signals related to the detected relative movement, the optical encoder comprising:

the scale having an optical grating formed therein;

a holding member having a surface with a plurality of reflecting regions each having different reflectance, facing the scale and being rotatable around a shaft together with the scale;

a light receiving portion having a plurality of photodiodes adapted to move relative to the scale and disposed so as to be associated with a pitch of the optical grating; and a light emitting portion for radiating light to the light receiving portion through the scale, wherein the optical encoder obtains a relative positional signal of the scale and the light receiving portion and a positional signal from a region corresponding to the reflecting region on the holding member having the different reflectance on the basis of signals generated from the light beam emitted from the photodiode and reflected by the optical grating of the scale and a signal generated from the light beam which is transmitted through the scale, reflected by the surface of the holding member, again transmitted through the scale, and received by the light receiving portion.

2. An optical encoder according to claim 1, further comprising a calculation processing circuit for calculating the relative positional signal and the positional signal on the basis of the output signal from the light receiving portion.

3. An optical encoder according to claim 2, wherein the calculation processing circuit calculates a magnitude of sum of squares of two phase signals obtained from the light receiving portion, and compares the calculated magnitude with a predetermined level so as to determine the region.

* * * * *